US010009334B2

(12) United States Patent
Chaudhury et al.

(10) Patent No.: US 10,009,334 B2
(45) Date of Patent: *Jun. 26, 2018

(54) RETRIEVAL OF DATA ACROSS MULTIPLE PARTITIONS OF A STORAGE DEVICE USING DIGITAL SIGNATURES

(71) Applicant: Google Technology Holdings LLC, Mountain View, CA (US)

(72) Inventors: Rashmi Chaudhury, San Ramon, CA (US); Srinivas Attaluri, San Jose, CA (US); Fangge Liu, Pleasanton, CA (US); Lakshmi Thyagarajan, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/345,088

(22) Filed: Nov. 7, 2016

(65) Prior Publication Data
US 2017/0078273 A1    Mar. 16, 2017

Related U.S. Application Data

(63) Continuation of application No. 14/569,236, filed on Dec. 12, 2014, now Pat. No. 9,489,535, which is a
(Continued)

(51) Int. Cl.
*H04L 29/06*    (2006.01)
*G06F 21/62*    (2013.01)

(52) U.S. Cl.
CPC ...... *H04L 63/0815* (2013.01); *G06F 21/6218* (2013.01); *H04L 63/0823* (2013.01)

(58) Field of Classification Search
CPC ..... H04L 63/00; H04L 63/08; H04L 63/0815; H04L 63/0823; H04L 63/10;
(Continued)

(56) References Cited

U.S. PATENT DOCUMENTS 6,694,434 B1    2/2004    McGee et al.
7,089,558 B2    8/2006    Baskey et al.
(Continued)

FOREIGN PATENT DOCUMENTS

WO    WO/2006/069274    6/2006
WO    WO/2008/008244    1/2008
WO    WO/2010/039118    4/2010

OTHER PUBLICATIONS

International Preliminary Report on Patentability in International Patent Application No. PCT/US2012/042344.
(Continued)

*Primary Examiner* — Jung Kim
*Assistant Examiner* — Adrian Stoica
(74) *Attorney, Agent, or Firm* — Byrne Poh LLP

(57) ABSTRACT

A system and method for exchanging data among partitions of a storage device is disclosed. For example, data stored in a first partition is exchanged with an application included in the first partition or with a second application included in a second partition. In one embodiment, the second application is associated with a global certificate while the first application is associated with a different platform certificate. A verification module included in the first partition receives a request for data and determines if the request for data is received from the first application. If the request for data is not received from the first application, the verification module determines whether the request is received from the second application and whether the global certificate is an authorized certificate. For example, the verification module determines whether the global certificate is included in a listing of authorized certificates.

18 Claims, 6 Drawing Sheets

Related U.S. Application Data continuation of application No. 13/168,932, filed on Jun. 24, 2011, now Pat. No. 8,938,809.

(58) Field of Classification Search
CPC . H04L 63/101; H04L 63/107; H04L 2209/60; H04L 2209/603; H04L 2209/64; H04L 2209/80; G06F 21/00; G06F 21/10; G06F 21/12; G06F 21/121; G06F 21/30; G06F 21/44; G06F 21/60; G06F 21/62; G06F 21/6209; G06F 21/6218; G06F 21/6227; G06F 21/629; G06F 21/64; H04W 12/00; H04W 12/06; H04W 12/08
See application file for complete search history.

(56) References Cited

U.S. PATENT DOCUMENTS

| | | | |
|---|---|---|---|
| 7,694,342 | B2 | 4/2010 | Maher et al. |
| 2004/0025022 | A1* | 2/2004 | Yach .................. G06F 21/121 713/176 |
| 2005/0268115 | A1 | 12/2005 | Barde et al. |
| 2007/0219919 | A1 | 9/2007 | Dandekar et al. |
| 2008/0162353 | A1 | 7/2008 | Tom et al. |
| 2008/0214309 | A1 | 9/2008 | Gatto et al. |
| 2011/0010701 | A1* | 1/2011 | Cooper .................. G06F 21/12 717/175 |
| 2011/0179476 | A1 | 7/2011 | Euler et al. |
| 2011/0191593 | A1* | 8/2011 | Cheng .................. G06F 21/126 713/189 |
| 2011/0239288 | A1 | 9/2011 | Cross et al. |
| 2012/0047499 | A1 | 2/2012 | Krzystofczyk et al. |

OTHER PUBLICATIONS

International Search Report and Written Opinion dated Sep. 28, 2012 in International Patent Application No. PCT/US2012/042344.
Notice of Allowance dated Sep. 12, 2014 in U.S. Appl. No. 13/168,932.
Office Action dated Apr. 23, 2014 in U.S. Appl. No. 13/168,932.
Office Action dated Sep. 22, 2015 in U.S. Appl. No. 14/569,236.
Notice of Allowance dated Jul. 7, 2016 in U.S. Appl. No. 14/569,236.
Office Action dated May 26, 2016 in U.S. Appl. No. 14/569,236.

* cited by examiner

RETRIEVAL OF DATA ACROSS MULTIPLE PARTITIONS OF A STORAGE DEVICE USING DIGITAL SIGNATURES

CROSS-REFERENCE TO RELATED APPLICATIONS

This application is a continuation of U.S. patent application Ser. No. 14/569,236, filed Dec. 12, 2014, which is a continuation of U.S. patent application Ser. No. 13/168,932, filed Jun. 24, 2011, each of which is hereby incorporated by reference herein in its entirety.

FIELD OF THE DISCLOSURE

The present disclosure relates generally to data retrieval and more particularly to exchanging data between partitions of a storage device using digital certificate permissions.

BACKGROUND

Computing devices such as smartphones, tablet computers and/or netbook computers are becoming increasingly powerful and increased network connectivity allows these computing devices to provide a wide range of functionalities and acquire an increased amount of data. While certain applications or processes may be pre-installed on a computing device, users are increasingly able to further increase a computing device's functionality by retrieving additional applications, processes or data from third-party providers. To prevent impairment caused by applications or data retrieved from a third-party provider, computing devices often include multiple partitions to segregate preinstalled applications or processes from applications or data retrieved from a third-party provider.

However, an application or data retrieved from a third-party provider may need to access data included in a partition separate from the partition including the data or application. Conventional approaches prevent an application or data retrieved from a third-party provider from accessing data or applications stored in certain partitions, such as a partition including pre-installed applications or data. This access limitation reduces the functionality of the data or applications retrieved from the third-party provider.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
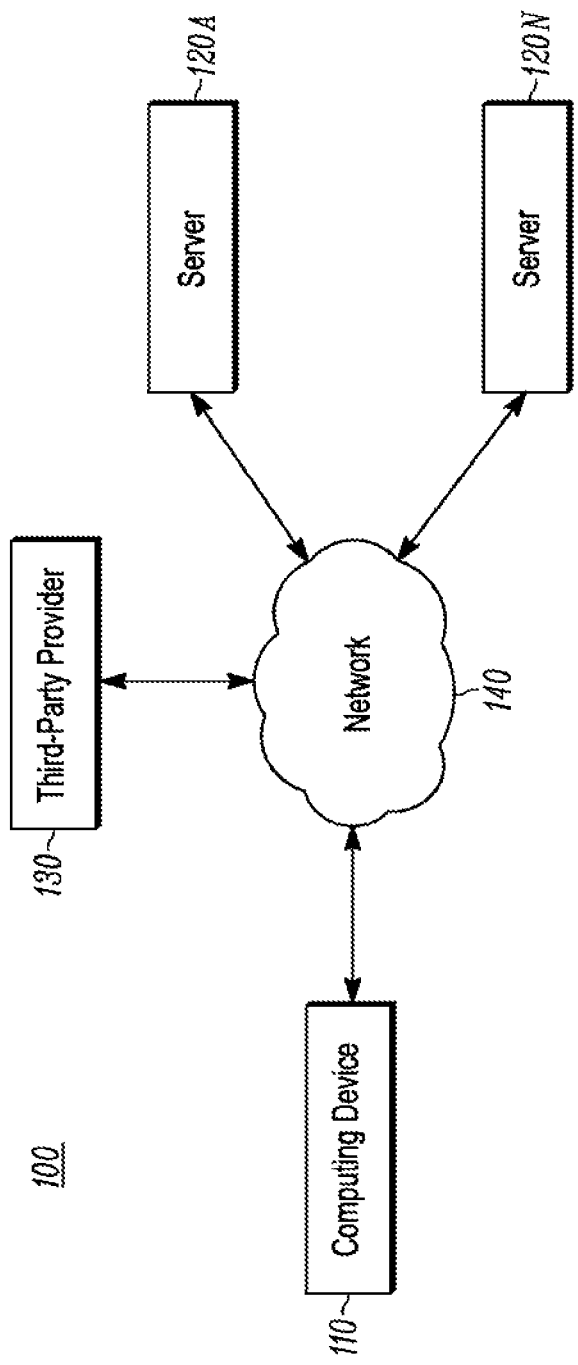
FIG. 1 is a block diagram of a computing system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing the specific details that are pertinent to understanding the embodiments of the present invention so as not to obscure the disclosure with details that will be readily apparent to those of ordinary skill in the art having the benefit of the description herein.

DETAILED DESCRIPTION

A system and method for exchanging data among a first partition of a storage device and a second partition of a storage device is disclosed. For example, data stored in a first partition, such as a secured or system partition, is exchanged with an application included in the first partition or with a second application included in a second partition, such as an unsecured or data partition. In one embodiment, the second application included in the second partition is associated with a global certificate while the first application included in the first partition is associated with a different platform certificate. In one embodiment, a verification module included in the first partition receives a request for data. Responsive to determining that the request for data is received from the first application in the first partition, the verification module communicates the requested data to the first application. If the request for data is received from the second application in the second partition, the verification module determines whether the global certificate associated with the second application is an authorized certificate. For example, the verification module determines whether the global certificate is included in a listing of authorized certificates. Responsive to determining that the global certificate is an authorized certificate, the verification module communicates the requested data to the second application.

In the following description, for purposes of explanation, numerous specific details are set forth to provide a thorough understanding of the invention. However, it will be apparent to one skilled in the art that the invention can be practiced without these specific details. In other instances, structures and devices are shown in block diagram form in order to avoid obscuring the invention.

System Overview

FIG. 1 is a block diagram of one embodiment of a computing system 100. In the embodiment shown by FIG. 1, the computing system 100 includes a computing device 110, one or more servers 120A, 120N (also referred to individually and collectively using reference number 120), a third-party provider 130 and a network 140. However, in different embodiments, the computing system 100 may include different and/or additional components than those depicted in FIG. 1.

The computing device 110 is any device with data processing and data communication capabilities. Examples of a computing device 110 include a smartphone, a tablet computer, a netbook computer, a laptop computer, a desktop computer or any other suitable device. The computing device 110 receives data or processes from one or more servers 120A, 120N and/or from a third-party provider 130 via the network 140. In one embodiment, the computing device 110 receives executable data or instructions from the third-party provider 130 via the network 140 that, when executed by the computing device 110, execute an application enabling user interaction with content. The application may store, retrieve or modify data included in the computing device 110 and/or exchange data with another computing device 110, a server 120 and/or a third-party provider 130. As further described below in conjunction with FIGS. 2-5, the computing device 110 may include data in different partitions and implement a method, such as the method described below, to allow an application to access data included in a different partition. The computing device 110 is further described below in conjunction with FIG. 2.

Servers 120A, 120N are computing devices having data processing and data communication capabilities that exchange data with the computing device 110 via the network 140. For example, a server 120 communicates data to the computing device 110 to update an application stored on the computing device or communicates data to the computing device 110 for use by one or more applications or processes executed by the computing device 110. A server 120 may push data to the computing device 110 via the network 140 and/or a computing device 110 may pull data from a server 120 via the network 140.

The third-party provider 130 is a computing device having data processing and data communication capabilities that includes data or instructions that, when executed by a processor, implement one or more applications. In one embodiment, the third-party provider 130 communicates the data or instructions for implementing an application to the computing device 110 via the network, so that the application is locally executed by the computing device 110. Additionally, the third-party provider 130 may also include data used by an application when the application is executed by the computing device 110. In one embodiment, the computing device 110 retrieves an application from the third-party provider 130 responsive to the application being identified by a marketplace or other data repository accessible by the computing device 110.

The network 140 is a conventional type for data and/or voice transmission. In various embodiments, the network 140 is a wired network, a wireless network or a combination of wireless and wired networks. The network 140 may have any number of configurations such as a star configuration, a token ring configuration or another configuration known in the art. Furthermore, the network 140 may comprise a local area network (LAN), a wide area network (WAN) (e.g., the Internet), and/or any other interconnected data path across which multiple devices may communicate. In yet another embodiment, the network 140 may be a peer-to-peer network. The network 140 may also be coupled to or includes portions of a telecommunications network for sending data in a variety of different communication protocols. For example, the network 140 may transmit voice data using one or more of a Global System for Mobile (GSM) communication system, Code Division Multiple Access (CDMA) system, Universal Mobile Telecommunications System (UMTS) or any other suitable protocols. The network 140 may also transmit data using one or more of General Packet Radio Service (GPRS), third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax) or any other suitable protocol. In yet another embodiment, the network 140 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email or other types of data known in the art.

Figure 2:
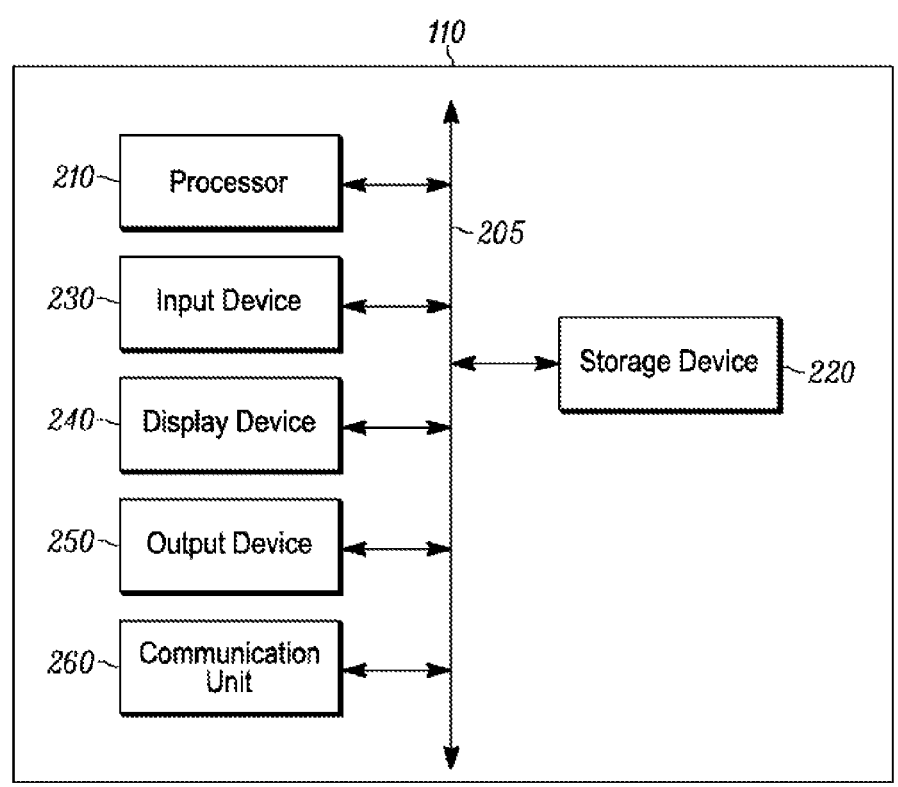
FIG. 2 is a block diagram of a computing device in accordance with some embodiments.

FIG. 2 is a block diagram of one embodiment of a computing device 110. In the embodiment shown by FIG. 2, the computing device 110 includes a processor 210, a storage device 220, an input device 230, a display device 240, an output device 250 and a communication unit 260 that are coupled together via a bus 205. However, in different embodiments, the computing device 110 may include different and/or additional components than those illustrated by FIG. 2.

The processor 210 processes data or instructions and may comprise various computing architectures. For example, the processor 210 may process data or instructions using a complex instruction set computer (CISC) architecture a reduced instruction set computer (RISC) architecture, an architecture implementing a combination of instruction sets or any other suitable instruction set. Although FIG. 2 shows a single processor 210, in other embodiments, the computing device 110 may include multiple processors. The processor 210 transmits, processes and/or retrieves data from the storage device 220, the input device 230, the display device 240, the output device 250 or the communication unit 260.

The storage device 220 stores data and/or instructions that, when executed by the processor 210, cause the processor 210 to perform one or more steps or to provide one or more types of functionality. The data and/or instructions included in the storage device 220 may comprise computer-readable code that, when executed by the processor 210, performs the methods described herein and/or provides the functionality described herein. The storage device 220 may comprise a dynamic random access memory (DRAM), a static random access memory (SRAM), a hard disk an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) a Flash memory or another memory device known in the art. The storage device 220 may be a persistent storage device, a non-persistent storage device or a combination of a persistent storage device and a non-persistent storage device in various embodiments. The storage device 220 is coupled to the processor 210, the input device 230, the display device 240, the output device 250 and the communication unit 260 via the bus 205. Example embodiments of the storage device 220 are further described below in conjunction with FIGS. 3A and 3B.

The input device 230 is any device configured to receive input from a user of the computing device 110 and communicate the received input to the processor 210, to the storage device 220 or to another component of the computing device 110. For example, the input device 230 comprises a cursor controller, a touch-sensitive display or a keyboard. In one embodiment, the input device 230 includes an alphanumeric input device, such as a keyboard, a key pad, representations of such created on a touch-sensitive display or another device adapted to communicate information and/or commands to the processor 210 or to the storage device 220. In another embodiment, the input device 230 comprises an input device for communicating positional data as well as data or commands to the processor 210 or to the storage device 220 such as a joystick, a mouse, a trackball, a stylus, a touch-sensitive display, directional keys or another suitable input device known in the art.

The display device 240 is a device that displays electronic images and/or data. For example, the display device 240 comprises an organic light emitting diode display (OLED), a liquid crystal display (LCD) or any other device such as a monitor. In one embodiment, the display device 240 includes a touch-sensitive transparent panel for receiving data or allowing other interaction with the images and/or data displayed by the display device 240.

The output device 250 comprises one or more devices that convey data or information to a user of the computing device 110. For example, the output device 250 includes one or more speakers or headphones for presenting audio data to a user. As another example, the output device 250 includes one or more light emitting diodes (LEDs) or other light sources to provide visual data to a user. As another example, the output device 250 includes one or more devices for providing vibrational, or haptic, feedback to a user. The above are merely examples of output devices 250 and the output device 250 may include one or more devices for providing auditory output, tactile output, visual output, any combination of the preceding or any other suitable form of output.

The communication unit 260 transmits data from the computing device 110 to the network 140 or to other computing devices 110 and/or receives data from the network 140 or from other computing devices 110. In one embodiment, the communication unit 260 comprises a wireless transceiver that transmits and/or receives data using one or more wireless communication protocols. For example, the communication unit 260 includes one or more wireless transceivers transmitting and/or receiving data using one or more wireless communication protocols, such as IEEE 802.11 a/b/g/n (WiFi), Global System for Mobile (GSM) communication system, Code Division Multiple Access (CDMA) system, Universal Mobile Telecommunications System (UMTS), General Packet Radio Service (GPRS), third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (Wi-Max), BLUETOOTH® or another wireless communication protocol. In another embodiment, the communication unit 260 is a network adapter for communicating with the network 140 or with another computing device 110 using a wired communication protocol, such as Universal Serial Bus (USB), Ethernet or another suitable wired communication protocol. In yet another embodiment, the communication unit 260 comprises a combination of one or more transceivers and a wired network adapter, or similar wired device.

Figure 3A:
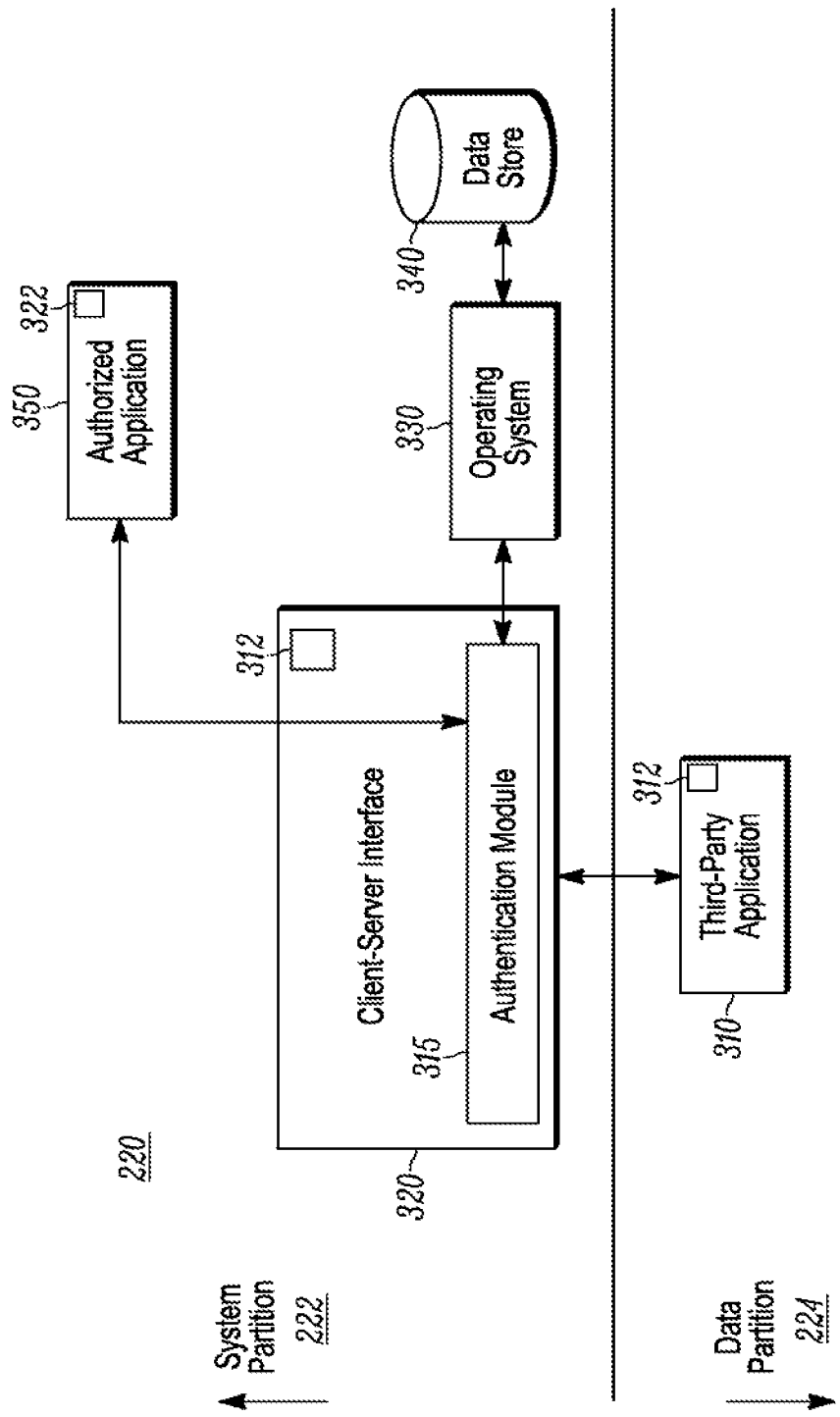
FIG. 3A is a functional block diagram of a storage device of a computing device in accordance with some embodiments.
Figure 3B:
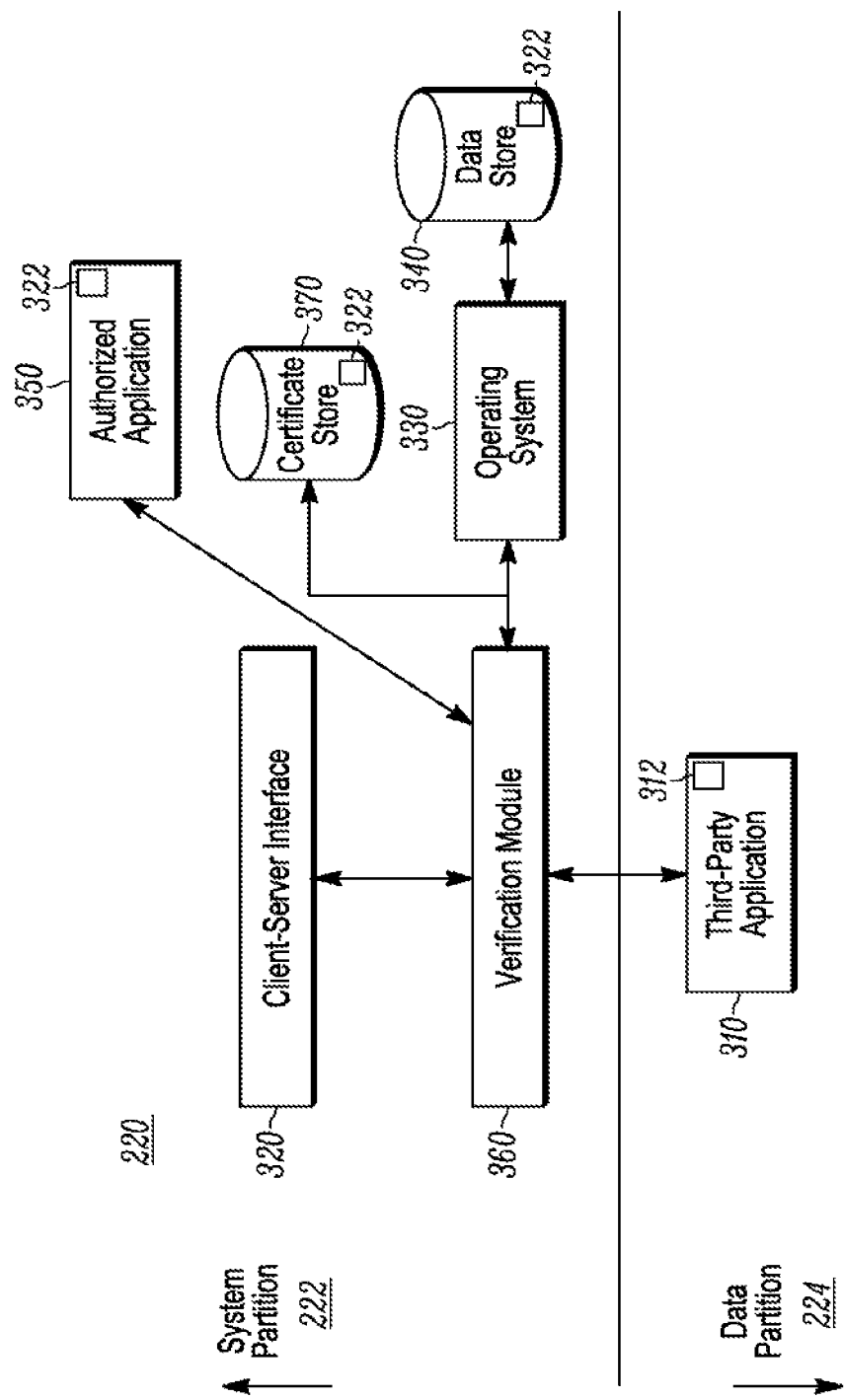
FIG. 3B is a functional block diagram of a storage device of a computing device in accordance with some alternate embodiments.

FIGS. 3A and 3B are functional block diagrams illustrating components stored in a storage device 220 in according to various embodiments. In FIGS. 3A and 3B, the storage device 220 includes two partitions, identified herein for purposes of illustration as the system partition 222 and the data partition 224; however, in other embodiments, the storage device 220 may also include additional partitions. Additionally, the techniques described herein may be applied to a storage device 220 having at least a first partition and a second partition. The system partition 222 stores secured data, and/or applications associated with a certificate and limits access to the secured data to applications or processes associated with the same certificate as the data or applications stored by the system partition 222. In one embodiment, the data or applications stored in the system partition 222 are associated with a platform certificate that is derived from predetermined criteria, such as the type of the computing device 110, the manufacturer of the computing device 110, a carrier providing network access to the computing device 110 or other suitable criteria. Thus, access to data or applications stored in the system partition 222 is limited to applications or processes also associated with the platform certificate. In conventional implementations, this limits access to data or applications stored in the system partition 222 to other data or applications stored in the system partition 222.

However, users of computing devices 110 increasingly retrieve, or download, applications from third-party providers 130 to enhance the functionality of a computing device 110. For example, applications providing specialized functionality, such as task management, weather forecasting, document generation or other tasks, are retrieved from a third-party provider 130 via the network 140 and then stored in the storage device 220. Conventionally, applications from third-party providers 130, also referred to herein as "third-party applications" or "unsecured applications," are stored in a partition of the storage device 220 different from the system partition 222. For example, a third-party application 310 is stored in a data partition 224 of the storage device 220. The data partition 224 is an unsecured portion of the storage device 220, including applications or data associated with different certificates. In conventional implementations, different applications or data retrieved from third-party providers 130 are associated with different certificates that differ from the platform certificate associated with data and/or applications in the system partition 222. This difference between platform certificate and application certificate prevents applications or data retrieved from a third-party provider 130 from accessing data or applications stored in the system partition 222.

FIG. 3A depicts a block diagram of an embodiment of a storage device 220 where a third-party application 310 is stored in the data partition 224 and a client-server interface 320, an operating system 330, a data store 340 and an authorized application 350 are stored in the system partition 222. For purposes of illustration, FIG. 3A identifies examples of data sharing between different components using lines coupled to different components.

The third-party application 310 is code and/or instructions that, when executed by the processor 210, allow interaction with content using the computing device 110. For example, the third-party application 310 displays images using the display device 240 or provides audio, haptic or other feedback via one or more output devices 250. In embodiments, the third-party application 310 also receives data using one or more input devices 230 or receives data or content via the communication unit 260. In the embodiment shown by FIG. 3A, the third-party application 310 is associated with a global certificate 312, which is a digital certificate associating a key with an entity, such as a certificate authority, using a digital signature. The global certificate 312 allows verification that the third-party application 310 is associated with an entity or is trusted by an entity.

In one embodiment, a permission is associated with the global certificate to denote the ability of the third-party application 310 to access data or applications stored by the storage device 220. For example, the global certificate 312 is associated with a signature permission. The signature permission allows a third-party application 310 to exchange data with other applications or data that are signed with the same digital signature that was used to generate the global certificate 312 and preventing the third-party application 310 from exchanging data with applications or data signed with a different digital signature than the signature generating the global certificate 312.

The client-server interface 320 is code and/or instructions that, when executed by the processor 210, manages exchange of data between one or more servers 120A, 120N and the computing device 110. In one embodiment, the client-server interface 320 updates data stored by the storage device 220, such as data stored in the data store 340. For example, the client-server interface 320 synchronizes data between one or more servers 120 and one or more authorized applications 350 or third-party applications 310, schedules timing of data synchronization between a server 120 and authorized application 350 or a thirdparty application 310, generates notification messages, manages one or more identifiers associated with the computing device 110, communicates video or image data from the computing device 110 to one or more servers 120, provides location-based services or performs other suitable processes. Hence, the clientserver interface 320 manages communication between the computing device 110, including applications executing on the computing device 110, and one or more servers 120.

The client-server interface 320 is also associated with the global certificate 312, which associates the client-server interface 320 with a key associated with an entity, such as a certificate authority, using a digital signature. In one embodiment the client-server interface 320 associates a system or signature permission with the global certificate 312. The system or signature permission allows an application signed with the same digital signature used to generate the global certificate 312 to access the client-server interface 320 while also allowing an application or data residing in the same partition as the client-server interface, the system partition 222 in the examples of FIGS. 3A and 3B, to access the clientserver interface 320. By associating the system or signature permission with the global certificate 312, the client-server interface allows data or applications having the same signature as the signature associated with the global certificate 312 to access the client-server interface 320 while also allowing applications or data residing in the system partition 222 to access the client-server interface 320. This increases the accessibility of the client-server interface 320 to applications or data within the data partition 224 associated with the global certificate 312 while maintaining the accessibility of the client-server interface to applications or data stored in the system partition 222.

In the embodiment shown by FIG. 3A, the client-server interface 320 includes an authentication module 315, which is code or instructions, that when executed by the processor 210, determines whether a third-party application 310 or an authorized application 350 is permitted to retrieve data from the data store 340, access the client-server interface 320 or retrieve data from another portion of the system partition 222. In one embodiment, the authentication module 315 determines whether an application is permitted to access the data store 340 or the client-server interface 320 based on properties of a certificate associated with the application. For example, if the client-server interface 320 associates a system or signature permission with the global certificate 312, the authentication module 315 determines whether an application requesting data or requesting communication with the client-server interface 320 resides in the system partition 222 or is associated with the same digital signature as the client-server interface 320. The authentication module 315 then allows access to data or to the clientserver interface if the application from which a request is received is stored in the system partition 222 or is associated with the global certificate 312. Operation of the authentication module 315 is further described below in conjunction with FIG. 4.

The operating system 330 comprises data or instructions that, when executed by the processor 210, interfaces between one or more components of the computing device 110 and an application or process which may receive data from a user. In one embodiment, the operating system 330 manages and coordinates use and sharing of computing device 110 resources. Additionally, the operating system 330 provides an environment in which applications are executed on the computing device 110, in which data stored by the computing device 110 is accessed or modified and in which data is stored by the computing device 110. For example, the operating system 330 communicates data to or from an application, such as an authorized application 350 or a third-party application 310, to or from the data store 340. In one embodiment, the operating system 330 receives requests for data from a third-party application 310 or an authorized application 350, retrieves the requested data from the data store 340 and communicates the requested data from the data store 340 to the authorized application 350 or to the third-party application 310. In an embodiment, the operating system 330 may also determine whether a certificate associated with an application is authorized to retrieve data from the data store 340 prior to retrieving the requested data.

The data store 340 is a portion of the storage device 220 where data is maintained. For example, the data store 340 may include configuration data used by the operating system 330, applications or data pre-installed by a computing device 110 manufacturer or a carrier providing the computing device 110 with access to a network 140.

The authorized application 350 is code and/or instructions that, when executed by the processor 210, allow interaction with content using the computing device 110 or exchange data with one or more components of the computing device 110. In one embodiment, an authorized application 350 presents content to a user via the display device 240 or one or more output devices 250. Alternatively, the authorized application 350 communicates data or instructions between one or more components of the computing device 110 or communicates data or instructions between the computing device 110 and one or more servers 120 via the client-server interface 320.

In the embodiment shown by FIG. 3A, the authorized application 350 is associated with a platform certificate 322, which is a digital certificate that uses a digital signature to associate a key with an entity, such as a computing device 110 manufacturer, a service provider, a carrier providing the computing device 110 with access to a network 140 or another suitable entity. Because the global certificate 312 differs from the platform certificate 322, the signature of the global certificate 312 and the platform certificate 322 are different. The authorized application 350 communicates with the authentication module 315 to retrieve data from the data store 340 or to communicate with the client-server interface 320. However, because the client-server interface 320 associates a system or signature permission with the global certificate, the authentication module 315 allows the authorized application 350 to exchange data with the client-server interface 320 and/or retrieve data from the data store 340 because both the client-server interface 320 and the authorized application 350 are included in the system partition 222.

FIG. 3B shows an alternative embodiment of a storage device 220 where a third-party application 310 is stored in the data partition 224 and a client-server interface 320, an operating system 330, a data store 340, an authorized application 350, a verification module 360 and a certificate store 370 are stored in the system partition 222. For purposes of illustration, FIG. 3B identifies examples of data sharing between different components using lines coupled to different components. The third-party application 310, the client-server interface 320, the data store 340 and the authorized application 350 are further described above in conjunction with FIG. 3A.

In the embodiment shown by FIG. 3B, the system partition 222 includes a verification module 360, which is code or instructions, that when executed by the processor 210, determines whether a third-party application 310 or an authorized application 350 is permitted to retrieve data from the data store 340 or to access the client-server interface 320. Responsive to receiving a request to access data or an application included in the system partition 222 or receiving a request to communicate with the client-server interface, the verification module 360 determines a certificate associated with the application from which the request is received. In one embodiment, the authentication module 315 determines whether an application is permitted to access the data store 340 or the client-server interface 320 based on properties of a certificate associated with the application.

For example, the verification module 360 determines whether the application from which the request was received is stored in the system partition 222. Responsive to determining the application from which the request was received is stored in the system partition 222, the verification module 360 communicates the request to the appropriate destination, such as to the data store 340 or to the client-server interface 320, and communicates data from the destination to the application from which the request was received. Responsive to determining the application from which the request was received is not stored in the system partition 222, the verification module 360 determines whether a signature associated with the certificate associated with the application from which the request was received and determines is associated with an application from which a request is to be allowed. For example, the verification module 360 determines whether a hash value associated with the certificate associated with the application from which the request was received is stored in a certificate store 370. The requested data is retrieved or the requested action is performed responsive to the hash value, or another suitable attribute associated with the certificate associated with the application from which the request was received, being included in the certificate store 370. Operation of the verification module 360 is further described below in conjunction with FIG. 5.

The certificate store 370 includes identifiers of certificates associated with applications, or other processes, which are authorized to retrieve data from the system partition 222 or are authorized to communicate with the client-server interface 320. In one embodiment, the certificate store 370 includes a hash value obtained from different certificates, so that if the hash value of a certificate is included in the certificate store 370, an application or process associated with the certificate store is permitted to access the system partition 222. In one embodiment, the certificate store 370 receives the identifiers from a server 120. Additionally, the certificate store 370 may be updated to modify the certificates which are permitted to access the system partition 222. For example, identifiers associated with certificates may be removed from the certificate store 370 or added to the certificate store 370 to modify the ability of applications to access data stored in the system partition 222.

In the embodiment shown by FIG. 3B, the third-party application 310 is associated with a global certificate 312, as described above in conjunction with FIG. 3A, and the authorized application 350 is associated with a platform certificate 322, as described above in conjunction with FIG. 3A. Because the verification module 360 determines whether to permit access to data in the system partition 222 or to the client-server interface 320 based on either the location of the application requesting access or the signature of the application requesting access, the third-party application 310 and the authorized application 350 are both able to access data in the system partition 222 and the client-server interface 320. Further, the embodiment shown in FIG. 3B shows the certificate store 370 and the data store 340 also associated with the platform certificate 322 because they are stored in the system partition 222.

Methods

Figure 4:
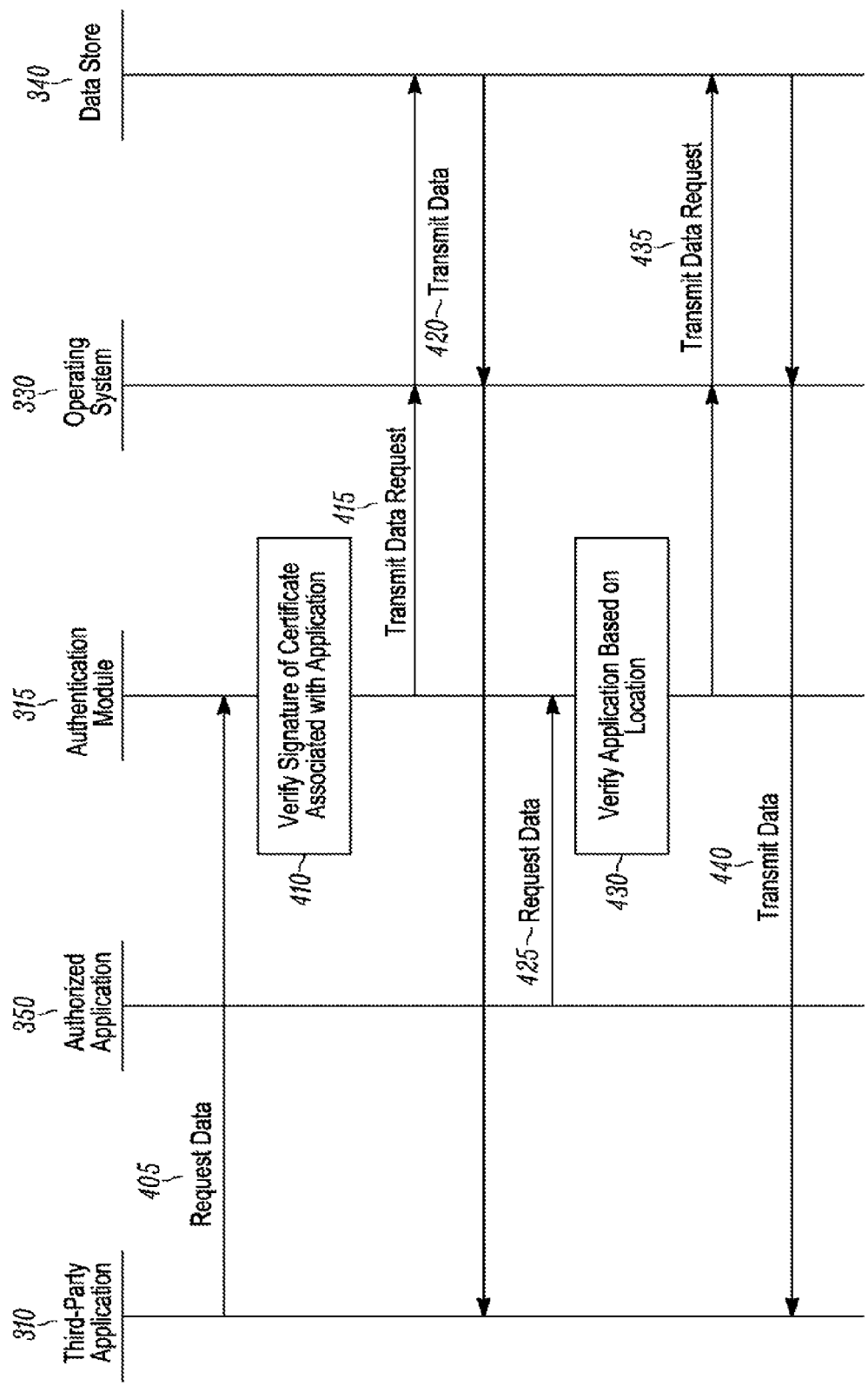
FIG. 4 is an event diagram of a method for retrieval of stored data by one or more applications in accordance with some embodiments.

FIG. 4 is an event diagram of one embodiment of a method 400 for accessing secured data by applications. Initially, FIG. 4 illustrates retrieval of secured data from a first partition, such as the system partition 222, by a third-party application 310. As further described above in conjunction with FIG. 3A, the third-party application 310 is associated with a global certificate 312 and is stored in a second partition, such as the data partition 224, of a storage device 220. The third-party application transmits 405 a request for data to the authentication module 315, which is stored in the system partition 222 of the storage device 220. In one embodiment, such as the embodiment shown in FIG. 3A, the authentication module 315 is included in the client-server interface 320.

Responsive to receiving the request for data, the authentication module 315 verifies 410 that the third-party application 310 is associated with the global certificate 312. For example, the authentication module 315 verifies 410 that the signature of the digital certificate associated with the third-party application 310 is the signature of the global certificate 312. Responsive to verifying 410 the global certificate 312 is associated with the third-party application 310, the authentication module 315 transmits 415 the request for data to the operating system 330, which then retrieves the requested data from the data store 340 and transmits 420 the data from the data store to the third-party application 310.

FIG. 4 also illustrates use of the authentication module 315 by an authorized application 350 to retrieve data from the data store 340. As shown above in FIGS. 3A and 3B, the authorized application 350 is included in the first partition, such as the system partition 222, of the storage device 220 and associated with a platform certificate 322. Initially, the authorized application 350 transmits 425 a request for data to the authentication module 315.

Responsive to receiving the request for data, the authentication module 315 verifies 430 that the request for data was received by an application stored in the system partition 222. While the client-server interface 320, which includes the authentication module 315, is signed with the global certificate 312, the clientserver interface 320 associates a system or signature permission with the global certificate 312. This allows the third-party application 310 to retrieve data from the system partition 222 because it is also associated with the global certificate while allowing the authorized application 350 to retrieve data from the system partition 222 because it is stored in the system partition 222 itself.

Responsive to verifying 430 that the request for data was received from an authorized application 350 included in the system partition 222, the authentication module 315 transmits 435 the request for data to the operating system 330, which then retrieves the requested data from the data store 340 and transmits 440 the data from the data store 340 to the authorized application 350.

Figure 5:
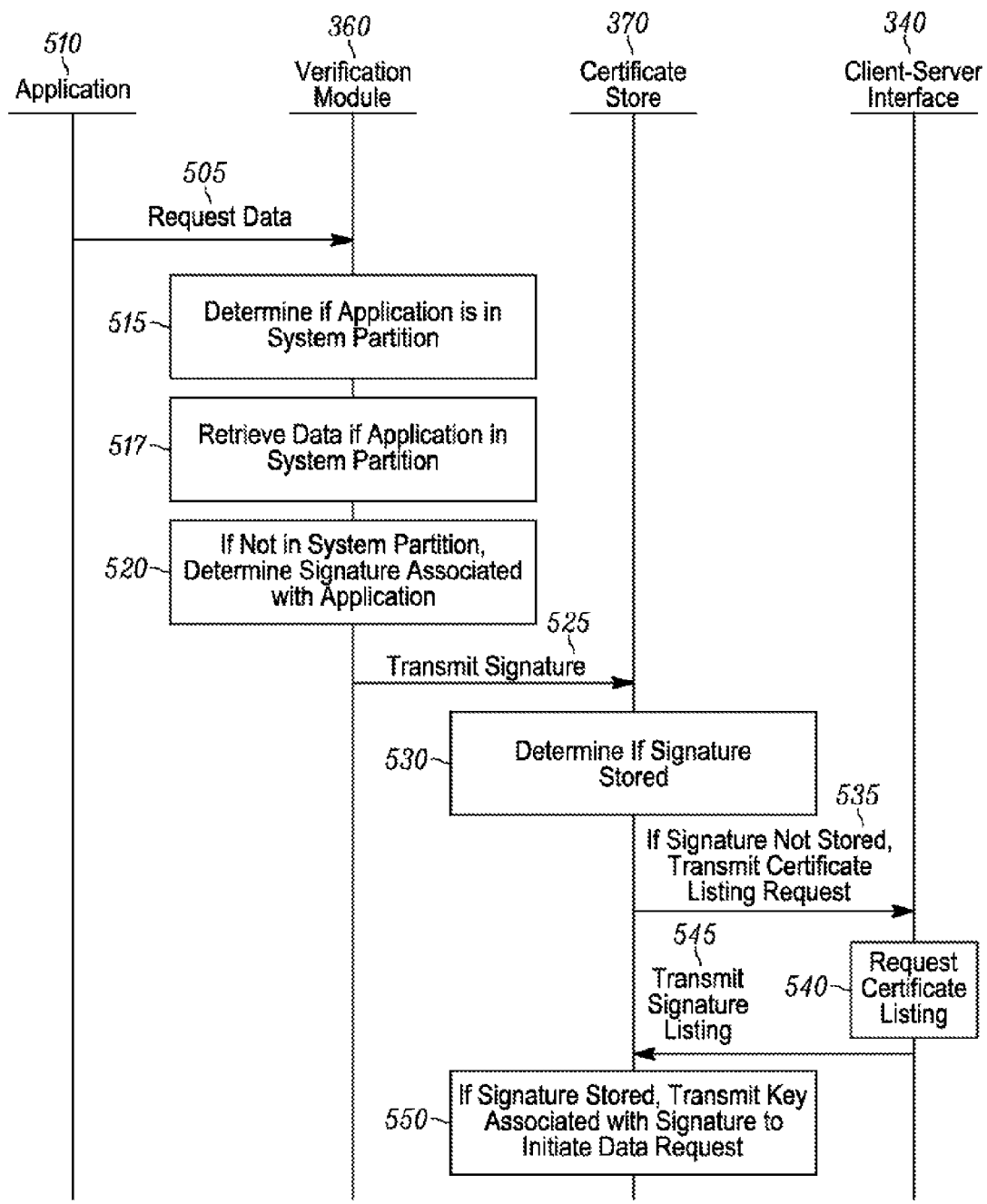
FIG. 5 is an event diagram of an alternative method for retrieval of stored data by one or more applications in accordance with some embodiments.

FIG. 5 is an event diagram of one embodiment of an alternative method for accessing secured data by an application 510. In the example shown by FIG. 5, the application 510 may be either an authorized application 350 or a third-party application 310, as FIG. 5 illustrates example operation of the verification module 360 in determining whether access to secured data is permitted.

Initially, the application 510 transmits 505 a request for data to the verification module 360, which is included in a first partition, such as the system partition 222 as shown by FIG. 3B. The verification module 360 then determines 515 whether the application is stored in the system partition 222. Responsive to determining 515 that the application 510 is stored in the system partition 222, the verification module 360 retrieves 517 the data. For example, the verification module 360 transmits the data request to the operating system 330 which then retrieves the data from the data store 340. As another example, the verification module 360 transmits the data request to the client-server interface 320, which retrieves the requested data from a server 120.

Responsive to determining that the application 510 is not stored in the first partition, such as the system partition 222, of the storage device 220, the verification module 360 determines 520 the signature associated with the application 510. For example, the verification module 360 determines 520 the signature associated with a digital certificate associated with the application 510. In one embodiment, if the application 510 is a third-party application 310, the verification module 360 determines 520 the signature associated with the global certificate 312. After determining 520 the signature associated with the application 510, the verification module 360 transmits 525 the signature to the certificate store 370, which determines 530 whether the signature is stored. If the signature associated with the application 510 is stored, the certificate store 370 transmits 550 a key associated with the signature to initiate data retrieval. For example, the certificate store 370 transmits 550 the key to the operating system 330 to retrieve data from the data store 340 or transmits 550 the key to the clientserver interface 320 to retrieve data from a server 120, or to otherwise access a server 120.

If the signature associated with the application 510 is not stored in the certificate store 370, the certificate store 370 transmits 535 a request for an updated certificate listing to the client-server interface 320, when then requests 540 an updated certificate listing from a server 120 or from another data source. After receiving the updated certificate listing, the client-server interface 320 transmits 545 the updated certificate listing to the certificate store 370. The certificate store 370 then determines whether the signature associated with the application is included in the updated certificate listing. If the signature associated with the application is included in the updated certificate listing, the certificate store 370 transmits 550 the key associated with the signature as described above. If the signature is not included in the updated certificate listing, the data is not retrieved and the certificate store 370 notifies the verification module 360 that the signature is not stored by the certificate store 370. In one embodiment, the verification module 360 may transmit a message or notification that the data cannot be retrieved back to the application 510.

Thus, the verification module retrieves the requested data if the application 510 is included in the system partition 222 of the storage device 220 or if the signature associated with the application is included in the certificate store 370.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for certificate permissions, the method comprising:
   receiving a request, from a first application, for data stored in a storage device that includes a second application;
   in response to receiving the request, determining, using a hardware processor, whether the first application is authorized to access the data stored in the storage device that includes the second application by determining whether a signature permission of a global certificate that is associated with the first application differs from a signature of the digital certificate that is associated with the second application;
   in response to determining that the signature permission of the global certificate that is associated with the first application and the signature of the digital certificate that is associated with the second application match, using a key from the global certificate associated with the first application to identify the data from the storage device that includes the second application; and
   transmitting the data included in the storage device to the first application.

2. The method of claim 1, wherein the data is stored in a first partition of the storage device, wherein the first application is included in a second partition of the storage device, and wherein the first partition of the storage device includes the second application.

3. The method of claim 2, further comprising:
   determining that the first application is included in the second partition of the storage device and not the first partition of the storage device; and
   in response to determining that the first application is included in the second partition of the storage device, determining whether the first application is authorized to access the data associated with the first partition.

4. The method of claim 1, wherein the comparison further comprises:
   retrieving the signature permission of the global certificate that is associated with the first application;
   retrieving the signature of the digital certificate that is associated with the second application; and
   determining whether the signature permission differs from the signature.

5. The method of claim 1, further comprising retrieving the key from the received request.

6. The method of claim 1, further comprising inhibiting the data from being exchanged with the first application in response to the comparison indicating that the signature permission of the global certificate that is associated with the first application and the signature of the digital certificate that is associated with the second application do not match.

7. A system for certificate permissions, the system comprising:
   a hardware processor; and
   a storage device coupled to the hardware processor, the storage device including a first partition, a second partition, and instructions that, when executed by the hardware processor, cause the processor to:
      receive a request, from a first application, for data stored in the storage device that includes a second application;
      in response to receiving the request, determine whether the first application is authorized to access the data stored in the storage device that includes the second application by determining whether a signature permission of a global certificate that is associated with the first application differs from a signature of the digital certificate that is associated with the second application;
      in response to determining that the signature permission of the global certificate that is associated with the first application and the signature of the digital certificate that is associated with the second application match, use a key from the global certificate associated with the first application to identify the data from the storage device that includes the second application; and
      transmit the data included in the storage device to the first application.

8. The system of claim 7, wherein the data is stored in the first partition of the storage device, wherein the first application is included in the second partition of the storage device, and wherein the first partition of the storage device includes the second application.

9. The system of claim 8, wherein the hardware processor is further configured to:
   determine that the first application is included in the second partition of the storage device and not the first partition of the storage device; and
   in response to determining that the first application is included in the second partition of the storage device, determine whether the first application is authorized to access the data associated with the first partition.

10. The system of claim 7, wherein the hardware processor is further configured to:
    retrieve the signature permission of the global certificate that is associated with the first application;
    retrieve the signature of the digital certificate that is associated with the second application; and
    determine whether the signature permission differs from the signature.

11. The system of claim 7, wherein the hardware processor is further configured to retrieve the key from the received request.

12. The system of claim 7, wherein the hardware processor is further configured to inhibit the data from being exchanged with the first application in response to the comparison indicating that the signature permission of the global certificate that is associated with the first application and the signature of the digital certificate that is associated with the second application do not match.

13. A non-transitory computer-readable medium containing computer-executable instructions that, when executed by a hardware processor, cause the processor to perform a method for certificate permissions, the method comprising:
 receiving a request, from a first application, for data stored in a storage device that includes a second application;
 in response to receiving the request, determining whether the first application is authorized to access the data stored in the storage device that includes the second application by determining whether a signature permission of a global certificate that is associated with the first application differs from a signature of the digital certificate that is associated with the second application;
 in response to determining that the signature permission of the global certificate that is associated with the first application and the signature of the digital certificate that is associated with the second application match, using a key from the global certificate associated with the first application to identify the data from the storage device that includes the second application; and
 transmitting the data included in the storage device to the first application.

14. The non-transitory computer-readable medium of claim 13, wherein the data is stored in a first partition of the storage device, wherein the first application is included in a second partition of the storage device, and wherein the first partition of the storage device includes the second application.

15. The non-transitory computer-readable medium of claim 14, wherein the method further comprises:
 determining that the first application is included in the second partition of the storage device and not the first partition of the storage device; and
 in response to determining that the first application is included in the second partition of the storage device, determining whether the first application is authorized to access the data associated with the first partition.

16. The non-transitory computer-readable medium of claim 13, wherein the method further comprises:
 retrieving the signature permission of the global certificate that is associated with the first application;
 retrieving the signature of the digital certificate that is associated with the second application; and
 determining whether the signature permission differs from the signature.

17. The non-transitory computer-readable medium of claim 13, wherein the method further comprises retrieving the key from the received request.

18. The non-transitory computer-readable medium of claim 13, wherein the method further comprises inhibiting the data from being exchanged with the first application in response to the comparison indicating that the signature permission of the global certificate that is associated with the first application and the signature of the digital certificate that is associated with the second application do not match.

* * * * *